United States Patent
Bregi

[15] 3,651,738
[45] Mar. 28, 1972

[54] POT BROACHING MACHINE

[72] Inventor: Benjamin F. Bregi, Grosse Pointe Shores, Mich.

[73] Assignee: Lear Siegler, Inc., Santa Monica, Calif.

[22] Filed: Jan. 26, 1970

[21] Appl. No.: 5,723

[52] U.S. Cl. .......................................... 90/10, 90/2, 90/86
[51] Int. Cl. ............................................... B23f 9/04
[58] Field of Search ................... 90/10, 2, 8, 1.4, 86, 63

[56] References Cited

UNITED STATES PATENTS

| | | |
|---|---|---|
| 2,644,369 | 7/1953 | Praeg .......................................... 90/10 |
| 3,492,917 | 2/1970 | Uber ........................................... 90/10 |
| 3,022,710 | 2/1962 | Kopec ....................................... 90/10 X |
| 2,346,867 | 4/1944 | Plephrey .................................... 90/10 |
| 2,194,595 | 3/1940 | Hart ........................................... 90/86 |

Primary Examiner—Gil Weidenfeld
Attorney—Whittemore, Hulbert & Belknap

[57] ABSTRACT

A pot broaching machine for broaching helical teeth on the periphery of a circular work piece in which helical guide means control rotation between the broach and work piece during the initial cutting action, after which the helical guide means becomes inoperative, and guiding action is provided by engagement between the broach teeth and the helical broached surfaces on the work piece.

5 Claims, 3 Drawing Figures

PATENTED MAR 28 1972 3,651,738
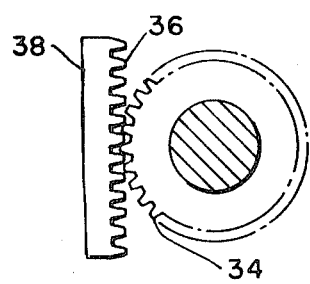
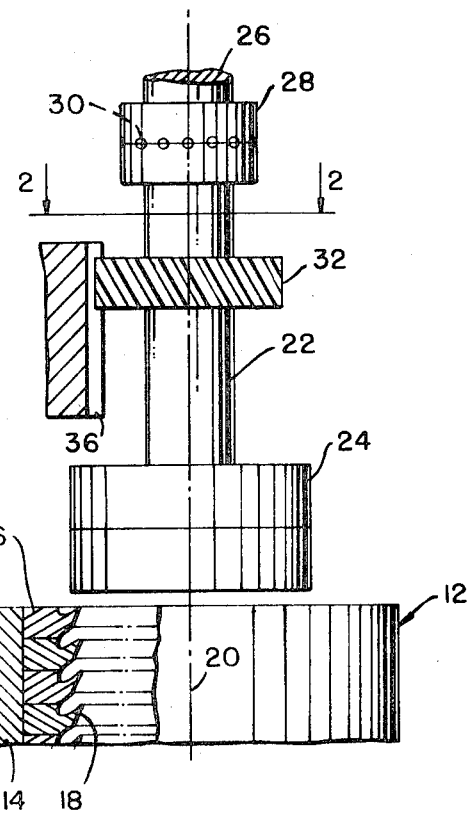
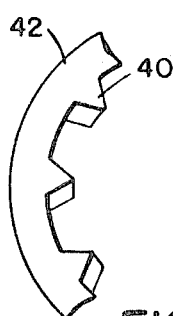
INVENTOR.
BENJAMIN F. BREGI
BY Whittemore,
Hulbert & Belknap
ATTORNEYS

POT BROACHING MACHINE

BRIEF SUMMARY OF THE INVENTION

External gears and related toothed parts have been successfully broached by a broaching operation including a generally tubular pot broach in which the broaching teeth are generally provided in a series of rings supported within a broach body.

In accordance with the present invention the broach teeth in the pot broach are arranged in helical alignment for the purpose of cutting helical teeth in the work piece. For this purpose the work support and the broach support are mounted for relative axial and angular movement, one of the supports being mounted for axial movement while the other support is held against axial movement, and one of the supports being mounted for angular movement while the other support is fixed against angular movement. In practice one support may be fixed both against axial and angular movement while the other support is both axially and angularly movable.

In order to establish the proper helical cutting action as the leading teeth of the broach initially engage the work piece, the present invention contemplates providing helical guide means connected between the supports and effective to produce relative rotation therebetween in timed relation to relative axial movement therebetween. Once sufficient cutting action has taken place, the helical guide means becomes inoperative and the necessary guiding action is thereafter established and maintained by engagement between the helical teeth of the pot broach and the helically cut surfaces on the work piece.

Specifically, the foregoing is accomplished by helical guide means comprising a rack and pinion, the members being dimensioned so that they disengage after a predetermined initial portion of the cutting stroke.

BRIEF DESCRIPTION OF THE DRAWINGS

FIG. 1 is a fragmentary elevational view, partly in section, showing the operating components of the broaching machine.

FIG. 2 is a fragmentary section on the line 2—2, FIG. 1.

FIG. 3 is a fragmentary generally diagrammatic view illustrating a specific broach component.

DETAILED DESCRIPTION

Referring now to the drawing, the broaching machine comprises a stationary frame a portion of which constitutes a broach support 10 and which supports a pot broach 12 comprising an annular support body 14 and a multiplicity of broach rings indicated at 16. It will be observed in the figure that in the illustrated arrangement the cutting teeth 18 of the broach face upwardly and are therefore adapted to cut on a downward stroke of the work piece. As illustrated in the figure, the axis of the pot broach is indicated at 20 and extends vertically.

Also mounted on the frame is means for effecting axial movement of a work support indicated herein as the shaft or spindle 22 on which a plurality of work pieces 24 are fixed. The means for effecting axial reciprocation of the work support 22 comprises a shaft 26 which may be the piston of a piston and cylinder device mounted on the frame above the broach support 10.

In order to provide for relative helical motion between the broach 12 and the work piece or work pieces 24, means are provided for permitting substantially free rotation between the work support 22 and the shaft 26. This means is diagrammatically indicated as a ball bearing 28 in which the balls are diagrammatically indicated at 30.

After the work piece has traversed a substantial distance through the elongated pot broach, helical surfaces are cut by the helical teeth of the broach and the engagement between the helical teeth of the broach and the helically cut surfaces of the work piece constitute adequate guiding means. In fact, the guiding means thus constituted produces an accuracy in the finished part which is substantially completely determined by the accuracy of the broach teeth. However, during the initial cutting stroke before the cutting teeth of the broach have formed adequate helically extending guide surfaces in the work piece, it is desirable to provide external helical guiding means.

In the present case the helical guiding means comprises a helical pinion 32 fixed to the work support 22 and having helical teeth 34 engaging inclined teeth 36 of a rack section 38. The dimensions of the rack and pinion are such that after a predetermined initial downward movement of the work support, the pinion moves out of engagement with the rack. Prior to this engagement the contact between the teeth of the rack and pinion constitutes an accurate helical guide for controlling the initial helical cut on the work piece. However, when the helical surfaces on the work piece have been cut to an extent where they can serve as effective guiding means, it is desired to discontinue the external helical guiding action and this of course is accomplished as a result of disengagement between the teeth of the pinion and the rack teeth on downward movement of the pinion.

In order that the guiding action between the pot broach and the work piece can be effective with a minimum downward stroke of the work piece, it is preferable that the leading teeth on the pot broach, which are the first to engage the work piece, are pointed in transverse cross section as indicated at 40 in FIG. 3, these teeth being formed on the first few rings 42 assembled at the top of the annular support body 14. Moreover, it is preferable that the number of the pointed teeth which accomplish the initial guiding action shall be less in number than the number of teeth to be broached on the work piece. The minimum number of pointed teeth provided for the purpose of establishing the guiding action will be three and the teeth will be equally circumferentially spaced around the pot broach so as to maintain a balanced cutting condition.

Referring again to FIG. 1 it will be noted that the pinion 32 is of smaller size than the internal diameter of the broach so that during the cutting stroke the pinion may enter into the pot broach. It will also be observed that with the arrangement illustrated, the axial spacing between the work piece or work pieces 24 and the pinion 32 is relatively short, thus providing a more rigid and effective support for transmitting angular movement to the work piece during the initiation of its downward cutting stroke.

While the illustrated embodiment of the invention is a vertical pot broach in which the axes of the work piece and the pot broach are coincident, it will be appreciated that the invention may be embodied in a machine in which the principal axis is horizontal or otherwise disposed. Moreover, while the illustrated embodiment of the machine shows a work piece movable axially downwardly, on its cutting stroke, it will be appreciated that the work piece might equally well be provided to be moved upwardly on its cutting stroke. Conversely, instead of moving the work piece in the cutting stroke, the work piece may be maintained against axial movement and the relative axial movement produced by moving the pot broach axially. Finally, it is to be understood that if desired, the support which is axially movable may be held against angular movement and that either the broach or the work piece may be supported thereon.

What I claim as my invention:

1. A helical pot broaching machine for cutting helically toothed work pieces which comprises a support for a generally tubular pot broach having helically arranged series of stepped cutting teeth therein, a support for a generally circular work piece to position the work piece with its axis in alignment with the axis of said broach, means for supporting one of said supports against axial movement and means for moving the other support axially, means for supporting one of said supports against angular movement about its axis and means for supporting the other of said supports for substantially free angular movement about its axis, helical guide means operatively connected between said supports and operable upon relative axial movement therebetween to cause relative angular movement therebetween in timed relation to said relative axial movement, said helical guide means comprising a rack having inclined teeth, and a helical pinion adapted to mesh with said rack and dimensioned to remain in contact therewith only during predetermined initial relative axial movement between said supports to establish an accurate helical cut in the work and thereafter remain out of contact to provide for helical guiding action solely by the engagement between the work and the helically disposed broach teeth, said work support comprising a shaft arranged to support the work piece during relative movement thereof through the broach, the pinion being fixed to the shaft and dimensioned to pass freely within said broach.

2. A machine as defined in claim 1 in which the leading broach teeth are pointed in transverse cross section to quickly establish guiding action by engagement with helically cut surfaces on the work piece.

3. A machine as defined in claim 2 in which the number of leading pointed broach teeth is less than the number of teeth to be cut on the work.

4. A machine as defined in claim 3 in which the leading pointed broach teeth are not less than three in number and are equally circumferentially spaced from each other.

5. A machine as defined in claim 1 in which the broach support is stationary and the means for moving the work piece through the broach comprises means connected to the shaft to push the work piece through the broach.

* * * * *